United States Patent [19]

Eagen et al.

[11] Patent Number: 5,295,241
[45] Date of Patent: Mar. 15, 1994

[54] METHOD AND APPARATUS FOR LOCAL FUNCTION KEY CONTROL OF SCROLLING ON CERTAIN COMPUTER WORKSTATIONS

[75] Inventors: Stephen T. Eagen; Harvey G. Kiel, both of Rochester; Nelson A. Martel, Jr., Stewartville; William C. Rapp; Schuman M. Shao, both of Rochester, all of Minn.

[73] Assignee: International Business Machines Corporation, Armonk, N.Y.

[21] Appl. No.: 576,032

[22] Filed: Aug. 31, 1990

[51] Int. Cl.$^5$ .............................................. G06F 3/14
[52] U.S. Cl. ..................................... 395/157; 395/145
[58] Field of Search ....................... 364/518, 521, 522; 340/747, 750; 395/157, 144, 155, 156, 161, 145, 148

[56] References Cited

U.S. PATENT DOCUMENTS 4,954,966  9/1990  Mooney et al. ..................... 364/518
5,175,813 12/1992  Golding et al. ..................... 395/157

Primary Examiner—Phu K. Nguyen
Attorney, Agent, or Firm—Steven W. Roth

[57] ABSTRACT

A method and apparatus for distributing the processing of cursor-independent scrolling functions, between a host processor and a workstation via a workstation control interface, the workstation control interface being connected to a plurality of workstations, wherein the host processor formulates a data stream incorporating scrollable panel data, definitions of cursor-independent scrolling keys, definitions of scrolling increments, and definitions of scroll indicators; the data stream is transmitted to the workstation control interface, which may be embodied in a workstation controller (or PWS), and the workstation controller (or PWS) formulates a display screen image for transmission to a workstation to which it is connected. A cursor-independent scrolling request received from a workstation is received by the workstation controller (or PWS) and processed for scrolling without further communication with the host processor.

4 Claims, 8 Drawing Sheets

```
File   Edit   View   Options   Help

Document List

Select one or more documents. Then select an action.
                                                          More:  ▼ ▲

Document        Subject                  Revised

_ Monthly       _ Monthly Accounting Summary   12/04/89
  _ Monthly2      _ Monthly Accounting Summary   12/04/89
  _ Reportap      _ April report           5/02/89
  _ Reportau      _ August report          9/05/89
  _ Reportfb      _ February report        3/03/89
  _ Reportja      _ January report         2/03/89
  _ Reportjl      _ July report            8/03/89
  _ Reportjn      _ June report            7/06/89
  _ Reportmr      _ March report           4/04/89
  _ Reportma      _ May report             6/05/89
  _ Reportno      _ November report        12/04/89
  _ Reportoc      _ October report         11/03/89
  _ Reportsp      _ September report       10/02/89
  _ Reportye      _ Year end report        12/21/89
  _ Spec203a      _ Printer specification  12/16/88

Command _
F1=Help   F3=Exit   F7=Bkwd   F8=Fwd   F9=Retrieve   F10=Actions   F12=Cancel
```

FIG. 6B

METHOD AND APPARATUS FOR LOCAL FUNCTION KEY CONTROL OF SCROLLING ON CERTAIN COMPUTER WORKSTATIONS

BACKGROUND OF THE INVENTION

The present invention relates generally to computer workstations which are connected for information interchange with host or mainframe computer systems; more particularly, the invention relates to a method and apparatus for controlling scrolling on certain computer workstations by function key operation at the workstation without participation of the host processor to which the workstation is connected. Further, the invention relates to a method and apparatus which significantly improves overall response time for the presentation and operation of scrolling in systems wherein a host processor executes applications programs and is connected to a plurality of remote terminals.

Historically, operator interface with a mainframe computer system evolved from a single operator control console which was attached to the mainframe structure. The operator control console amounted to little more than a keyboard for enabling the operator generation of simple input commands, and a display screen for enabling the mainframe computer to present simple status messages to the operator. The evolution and expansion of this concept led to the development of multiple, limited-intelligence terminals, to enable a number of users to communicate with a mainframe system, wherein the multiple terminals were perhaps remotely positioned from one another, and from the mainframe system, but commonly connected to a controller, and the controller was connected to the mainframe computer system. However, the multiple terminal concept was a relatively low cost solution to enable multiple users to communicate with a mainframe computer system, but with limited intelligence contained within each terminal, so that the user communication was restricted to relatively simple input/output transfers.

The development of the stand-alone personal computer (PC) provided a high level of internal intelligence to enable a great many user interface functions to be added to the PC, with the result that the PC became a very "user friendly" device. Among the interface enhancements which were made possible by the PC development were enhanced cursor controls, scrolling, and windows. These enhancements greatly improve the computer's communication with a user.

The user friendly PC soon became adapted for communication with host computer systems, initially by connecting the PC to a controller, and by writing software to enable the PC to emulate a terminal with limited intelligence, normally connectable to the controller. Eventually the PC/mainframe workstation control interface was developed to enable a PC to communicate more or less directly with a host processor, wherein the independent intelligence contained within a PC could be used both to enhance the user interface with the host system and to independently execute software apart from the host system. A class of terminals evolved utilizing these concepts, which became known as "intelligent" terminals, and the previously evolved, limited-intelligence terminals became known as "dumb" terminals. By virtue of the widely varying internal intelligence of these two types of terminals, the capabilities and rules for using the terminals also became widely varied. However, when either of the aforementioned types of terminals are connected to a host processor, the host processor typically dictates overall system operation through execution of various application programs. The application programming interfaces provide the capability to present scrollable panel data at each of the connected terminals, which enables an application program to define more data to the user than will fit on the screen at one time, and also provides the user with the ability to look at data before or after the data currently presented on the screen.

There are two techniques for scrolling data; cursor-sensitive and cursor-independent scrolling. Cursor-sensitive scrolling is invoked by the user when an arrow key is depressed on the keyboard when the cursor is on the top or bottom of the scrollable panel area. Cursor-independent scrolling is invoked by the user by depressing a scroll function key. The present invention relates to cursor-independent scrolling techniques, and more particularly to a method and apparatus for local control of cursor-independent scrolling without interaction with the host processor.

In the prior art, the host applications program or its display interface program manages the scrolling of display panel data. Whenever the user depresses a cursor-independent scroll key, an interrupt is generated to the host processor, to enable the host processor to reconfigure the panel display and to retransmit a new data stream incorporating the scrolled panel information. In typical prior art systems this interrupt creates a 1-2 second delay in user response time while the panel is being retransmitted and rewritten with new data in the scrollable area. If the user finds it necessary to activate the scroll key several times before finding the data that is being sought, each scroll key action creates a new interrupt and new transmission, thereby increasing the amount of response time delay. In a system utilizing a large number of remote terminals the problem becomes further complicated by virtue of the multiplication of response time delays which may potentially be caused by users at a plurality of terminals activating scrolling key commands at the same time. Windowing further complicates the problem by causing more scrolling requests, due to the decreased area in which to present scrollable data. Therefore, in larger systems, the response time delay becomes extremely bothersome to the user and results in significantly reduced efficiency in the user's ability to interact with the system.

In any typical prior art system utilizing a host processor and workstations, wherein the workstations are utilized for user interaction and access and the host processor is utilized for running applications programs, the host processor provides certain fundamental information. For example, the host processor may generate a data stream containing information to be displayed on a workstation screen, and information for controlling the presentation and position of the data on the screen. The data stream generally does not convey any logical intelligence, i.e. information to enable the workstation to independently control and manipulate subsequent screen display panels as a consequence of its interfacing with the user. The control and manipulation of each screen display panel is typically generated by the host processor, by transmitting a new data stream for each panel, wherein each data stream contains new presentation and position information. In the case of a programmable workstation (PWS), the host processor data stream is sent directly to the workstation and is processed internally in the workstation, which itself contains sufficient internal memory and program data to directly control the interaction with the display screen and keyboard. In the case of the DWS, the host processor data stream is sent to a workstation controller (WSC), and the WSC provides the internal memory and control for directly controlling the display screen of the DWS. In either case, the host processor-constructed data stream is received by a workstation control interface (hardware and/or software), and the workstation control interface processes the data stream. The workstation controller may poll the workstation to determine whether a keystroke should be recognized or whether any of a predetermined number of commands have been accepted.

Although a PWS terminal is of considerably more sophisticated design than a DWS terminal, when it is used in an environment where a host processor executes applications programs and merely utilizes the PWS terminal for operator/user interface, the PWS terminal suffers from most of the same limitations as a DWS terminal. For example, each time a display panel is changed on the screen of either type of terminal, the host processor creates the panel description, and presentation, and constructs a data stream for transmission to the terminal. A typical data stream transmission may include 2,000 bytes of information, more or less, and may require a transmission time of at least several seconds, in addition to the processing time required for creating and developing the data stream. In a system involving a considerable number of such terminals, the processing load and transmission time constraints are cumulative, leading to significant reduction in overall system performance. The present invention deals with a method for improving that performance with respect to both PWS terminals and DWS terminals. However, for convenience herein, reference will be made primarily to DWS terminals throughout, it being understood that the uses and advantages of the invention are equally applicable to both types of terminals. Where reference is made herein to workstation controllers (WSC), it should be understood that such controllers are associated with DWS terminals, and PWS terminals do not utilize workstation controllers. PWS terminals communicate directly with the host processor through suitable I/O communications controls, but PWS devices have internal logic which effectively performs the same workstation control interface functions as are performed by workstation controllers.

SUMMARY OF THE INVENTION

The present invention provides a method and apparatus for performing scrolling locally at a workstation controller or PWS, in response to a cursor-independent scrolling keystroke by the user. This is enabled by an extended data stream interface between the host processor and the WSC or PWS, including data which defines the position, size and scrollable panel area contents, the cursor-independent scroll keys, the scroll increment, and scroll indicators. The scrollable panel area data is stored locally within the workstation controller, and is controlled independently by the workstation control interface without access to the host processor.

It is a feature of the present invention to enable the display data manager software within a host processor to be written so as to provide a consistent mechanism within the applications program interface for the definition of scrollable panel area data in all workstation environments.

It is another feature of the present invention to provide a storage area within the workstation controller and/or workstation so as to enable the transmission of scrollable panel area data between the WSC and host processor in a logical representation rather than a physical representation; i.e., scrollable panel area data may be represented by logical descriptors rather than by assigned screen addresses.

It is another feature of the present invention to provide the flexibility for the application or host display data manager software to define the valid cursor-independent scrolling keys; i.e., specific function keys may be assigned by the software to regulate upward and/or downward scrolling.

It is another feature of the present invention to provide various scrolling increments for cursor-independent scrolling, so that the number of items scrolled at a time can vary, and to permit the host processor application or display data manager software to define the scrolling increment.

It is another feature of the present invention to provide the flexibility for the host processor application or display data manager software to define the types of scroll indicators to be used at a remote terminal, i.e., textual and/or symbolic, and the information required to present them.

It is a principal object of the present invention to provide a method and apparatus for local control of cursor-independent scrolling, without reference to the host processor.

It is another object of the present invention to provide cursor-independent scrolling at a workstation or a workstation controller from a generalized data stream from the host processor, wherein the host processor does not require specific information concerning the type and/or identity of the workstation.

It is another object of the present invention to distribute the processing load associated with the performance of scolling activities, so as to reduce response time and maximize the efficiency of the entire processing system and the user.

BRIEF DESCRIPTION OF THE DRAWINGS

The foregoing and other objects and advantages of the invention will become apparent from the following specification, and with reference to the claims and the appended drawings, in which:

FIGS. 6A and 6B show an example of panel modification as a result of function key scrolling according to the invention;

DESCRIPTION OF THE PREFERRED EMBODIMENT

Programmable Workstation

Figure 1:
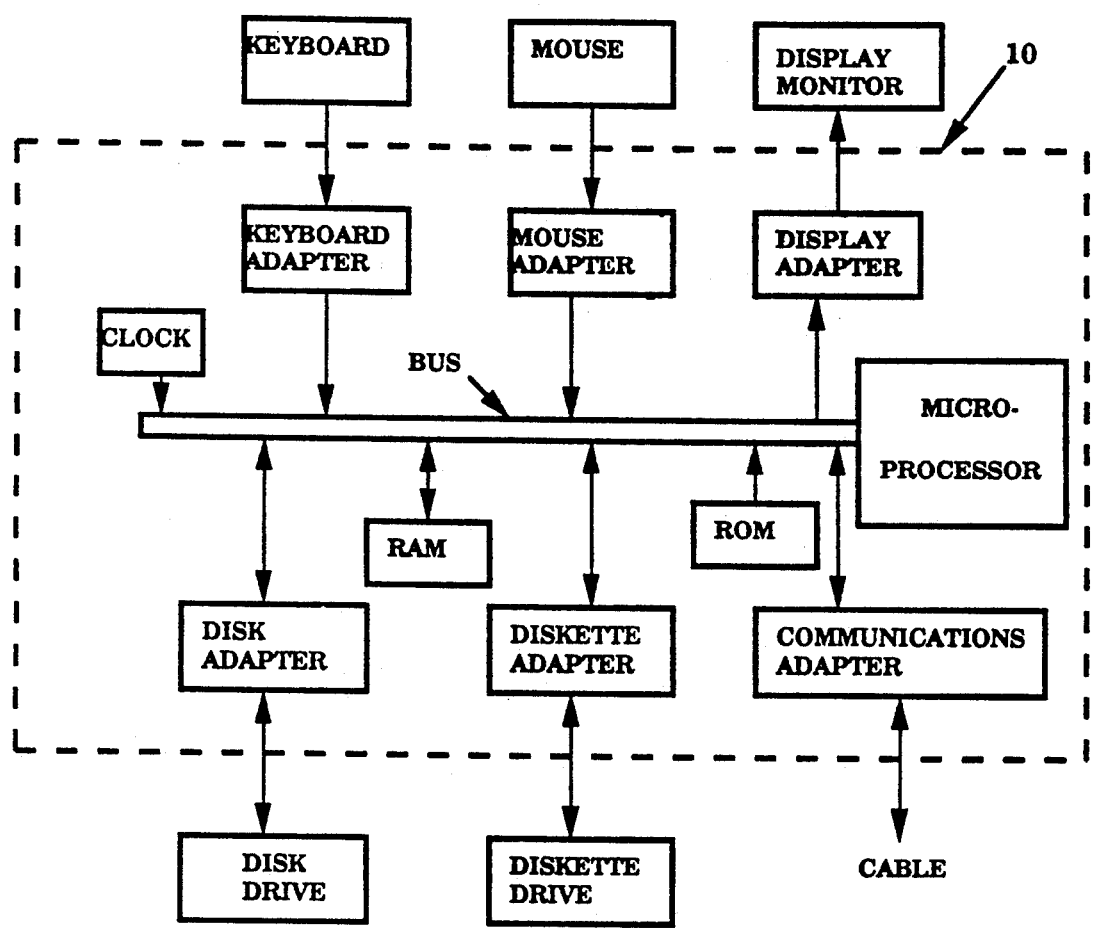
FIG. 1 shows a typical block diagram of a PWS.

Referring first to FIG. 1, there is shown a typical block diagram of a PWS; the circuits within the dotted outline 10 are generally found on one or more circuit boards within the PWS framework. The microprocessor is typically an Intel type 80286 or 80386, or equivalent microprocessors by other manufacturers. The microprocessor has an external bus which may communicate with a number of adapters which themselves are connectable to various internal and external devices.

The host processor communicates with the PWS via a communications line, identified as a "cable" in FIG. 1. A plurality of PWS devices may be connected to a host processor via such communications lines, wherein each PWS has an internal application program known as "Workstation Function," which enables the PWS to perform the same tasks as a workstation controller as hereinafter described. The host processor is not concerned with, nor does it require specific knowledge of, which of the several types of remote terminals it is communicating with. When the host processor determines that a display screen representation is to be transmitted to a remote terminal, it constructs a data stream having the content described above, which is known in the prior art as a "5250 data stream." The format of this data stream is identical for communications with a PWS and a WSC, for the Workstation Function software operating within the PWS enables the PWS to process the data stream in the same manner as a WSC would process the data stream. While the processing actions within a PWS differ from the processing actions within a WSC, the external interaction with a host processor is identical in both cases. Likewise, when the operator at a remote terminal makes a keystroke, the processing actions which pass to the host processor are identical in either case, although the internal processing within a PWS is different from the internal processing within a workstation controller.

The typical PWS will have a keyboard, and optionally a mouse, connected through adapters to the internal bus, a display monitor connected through an adapter to the internal bus, one or more disk or diskette adapters coupled to one or more disk or diskette drives and connected to the internal bus, and a communications adapter which is connectable to other systems via external cables. The RAM is typically a random access memory having 1-16 megabyte capacity, which is sufficiently large to store a complete operating system, an extensive work area for programmable calculations, a monitor screen buffer area and an area for executing application programs. The ROM is a read only memory which typically contains coding for initializing the machine, for performing diagnostic operations, and for controlling the basic I/O system; the ROM is typically 64-128 kilobytes in capacity. The PWS is therefore operable as a stand-alone computer system, or as an independent workstation which may be connected to a host computer via external cables. The capabilities of the PWS enable it to provide a wide variety of user enhancements, including a full range of cursor controls, instantaneous scrolling, and display screen modification. All of these enhancements are contained and controlled within the PWS itself, although when a PWS is connected to a host computer processor and is operated as a workstation, it receives its overall command and control from the applications software in the host processor. For example, the host processor may transmit a data stream embodying display screen content to the PWS, and may identify the formats by which the data is to be displayed and controlled, but once the PWS receives the broad directions from the host processor the PWS itself generates the internal control signals for regulating the actual data display on the display monitor. In the preferred embodiment, the PWS shown in FIG. 1 is an IBM Personal System/2 or equivalent, although another IBM personal computer, or equivalent design, could be used.

Dependent Workstation

Figure 2:
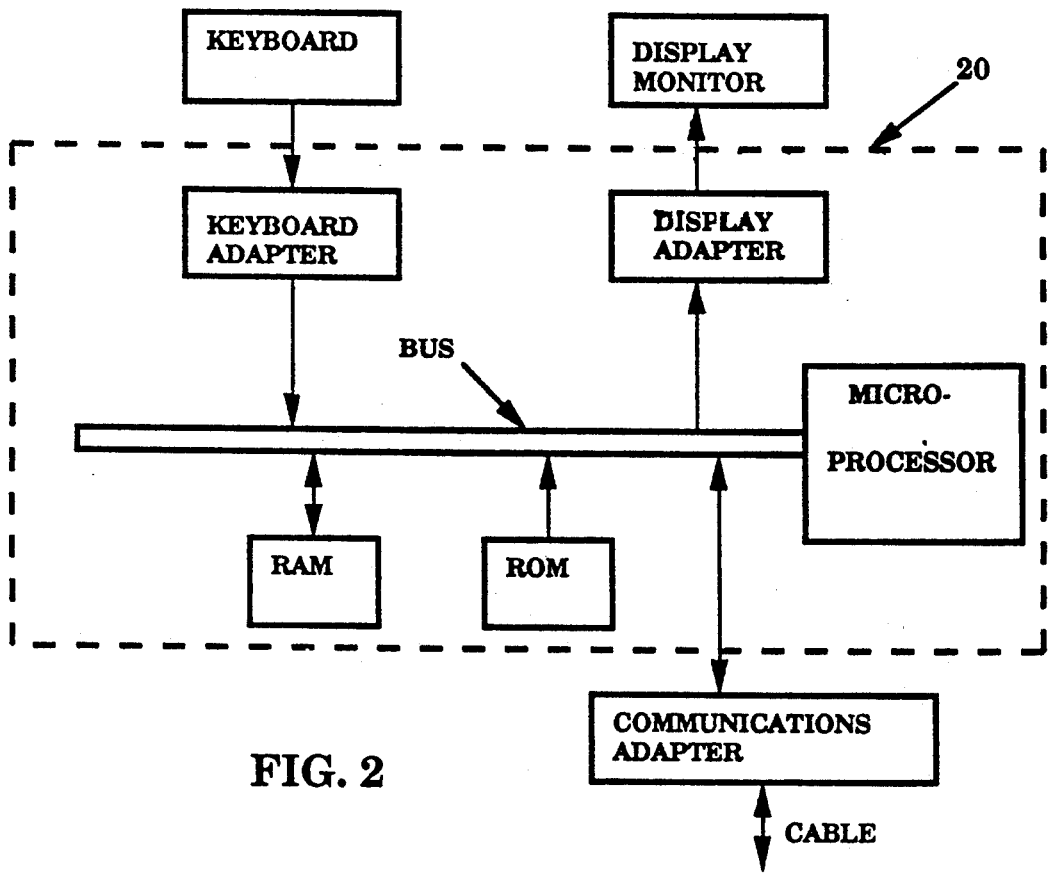
FIG. 2 shows a typical block diagram of a DWS.

FIG. 2 shows a typical block diagram of a DWS, wherein the circuits typically found within the framework are designated within dotted outline 20. The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the DWS and a workstation controller. The RAM is typically capable of 3-5 kilobytes of storage, for storing a screen buffer, and for providing a limited amount of memory work area for internal processing. The ROM is typically about 8 kilobytes in capacity, for storing coding relating to power-on processing, diagnostics, and character generation patterns an process communication protocols for communicating with other systems. The DWS is incapable of any significant internal processing beyond that which is required to interface with the keyboard and display monitor, and to communicate via the communications adapter. Therefore, all of the information displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC. In the preferred embodiment, the DWS shown in FIG. 2 is an IBM 5250 family display, although other equivalent types of DWS could be used.

Workstation Controller

In typical systems, the function of a "workstation controller" is to provide information transfer and control to a plurality of remote terminals from a single host processor. This workstation control interface function is usually performed by a hardware and software package which is uniquely identified and separate from the host processor hardware and software packages. The hardware for a workstation controller is typically contained on a circuit board package or packages which is pluggable into a host processor card slot, and the software for a workstation controller is typically executed by the hardware independently of software which is executed by the host processor. However, in certain systems, the workstation control interface function of a "workstation controller" is entirely a software package function, the software being executed within the host processor hardware. Although the preferred embodiment of the present invention is disclosed with respect to the workstation controller concept which is physically separate from the host processor in both hardware and software details, the invention is applicable to the second type of workstation controller, wherein the functions are performed entirely by a software package residing in a host processor.

If a workstation controller is physically remotely positioned from the host processor, its communications with the host processor are made via communication lines, connected in a manner similar to the connection of various other remotely located devices. If the workstation controller is physically incorporated into the host processor mainframe as a pluggable card, the workstation controller may communicate with the host processor utilizing the normal channel connections associated with the host processor.

Figure 3:
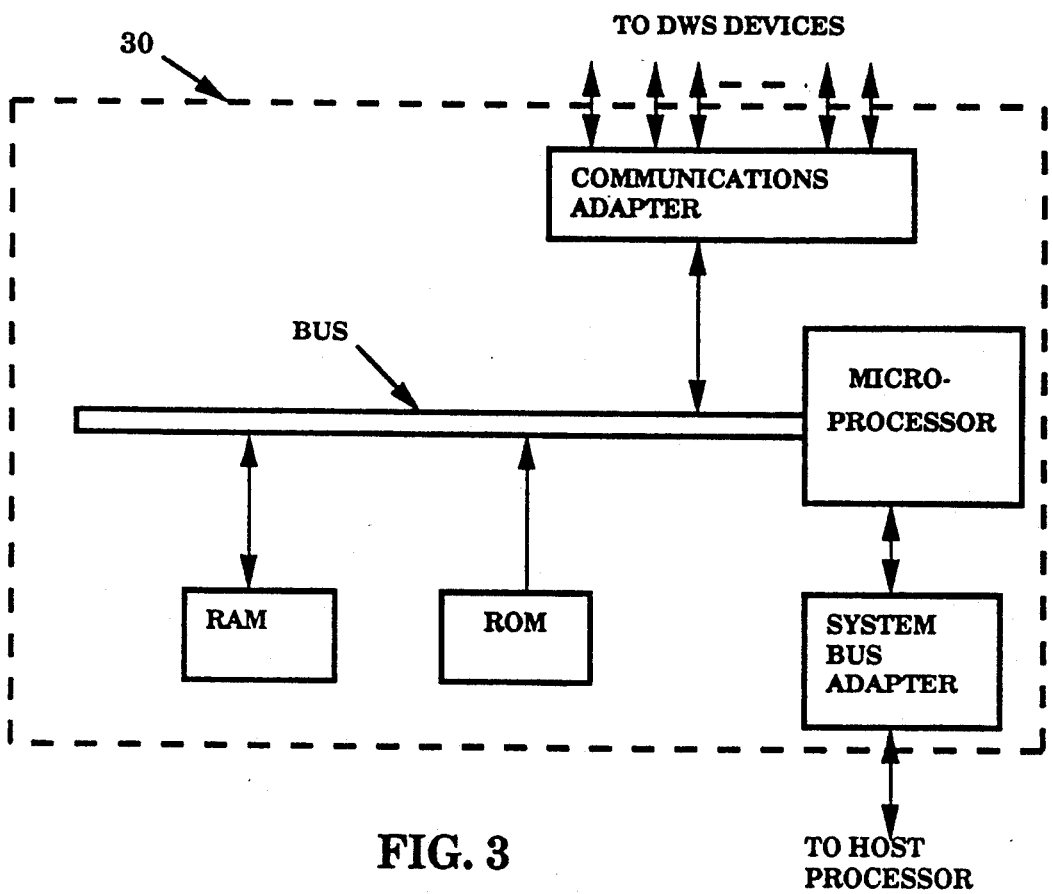
FIG. 3 shows a typical block diagram of a workstation controller.

FIG. 3 shows a typical block diagram of a workstation controller, of the type which typically communicates with a plurality of DWS devices. The workstation controller has a number of circuits contained within a package designated by dotted outline 30, and a microprocessor which is typically an Intel type 80826 circuit chip, or equivalent. The WSC microprocessor is typically connected to a system bus adapter which itself may communicate with a host computer processor. The WSC also has an internal data bus and a RAM having a capacity of 0.5-2.0 megabytes, and a ROM having a capacity of about 16 kilobytes, containing coding for initializing the WSC and for diagnostics relating to the WSC. The internal data bus of the WSC is connected to a communications adapter, which is externally connected to a "fan-out" multiplexer for enabling a plurality of DWS devices to communicate with a single WSC. In a typical application, the fan-out circuits are connectable to up to 40 DWS devices, and the screen display information for each of these DWS devices is stored within the WSC RAM memory. Likewise, keystroke signals from all of the DWS devices are received by the WSC and stored within the RAM, for subsequent communication to the host processor or for internal processing by the WSC. In the preferred embodiment the WSC of FIG. 3 is a "feature card" for an AS/400 computer system, wherein the microprocessor is suitably programmed.

Figure 4:
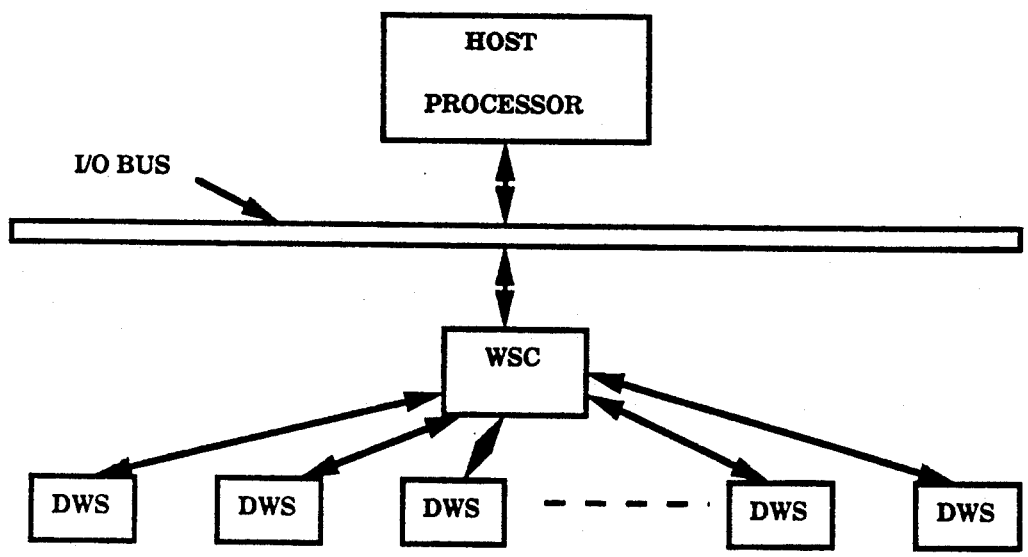
FIG. 4 shows a typical block diagram of a plurality of DWS devices connected to a host computer via a WSC.

FIG. 4 shows a typical block diagram of the system interconnections, wherein the host processor communicates with a WSC via an I/O bus, and a WSC communicates with up to 40 DWS devices via communications cables. Other devices and controllers may be connected to the I/O bus for communication with the host processor. In the preferred embodiment, the host processor is part of an AS/400 computer system.

Under typical operating conditions in the prior art, the host processor will construct a screen display for each of the terminals to which it is connected, the host processor will then transfer the data representative of each screen display to the WSC, where it is retained within a section of RAM identifiable with each particular DWS. The WSC then transfers the screen display data to each of the DWS devices, and each DWS device contains sufficient internal storage to retain the screen display data for purposes of presenting the display image to the user. If a DWS user makes a keystroke, the DWS indicates that the DWS has keystroke data available for transfer to the host processor. The WSC makes the transfer of this keystroke data when polling the DWS. The WSC retains in its internal memory and control information relating to all of the screen display images with which it is dealing. It transmits to and receives this information from the host processor upon command.

Figure 5:
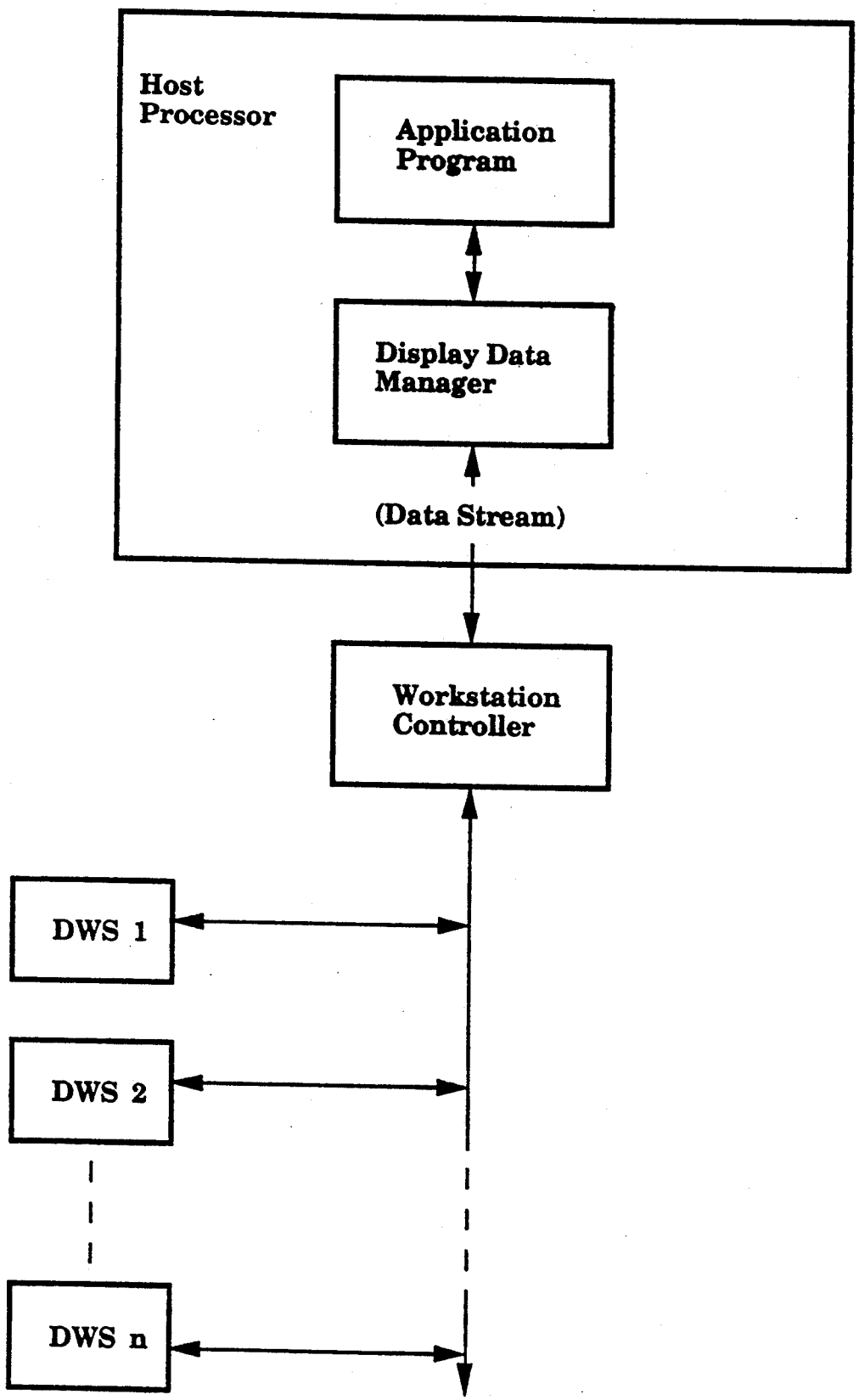
FIG. 5 shows a simplified diagram illustrating display data flow in a system having DWS terminals.

FIG. 5 shows a simplified diagram to illustrate the display data flow in a system having DWS terminals. The host processor executes application programs as a part of its normal operating function. These application programs communicate, from time to time, with the remote terminals connected in the system, either by processing keyboard data sent from the terminals or by generating display information to be transmitted to the terminals for display. When an applications program needs to communicate with a remote terminal it calls up an applications program interface routine, one form of which is identified as a "display data manager." When information is to be displayed at a remote terminal, the display data manager constructs a data stream according to a particular format, and transmits this data stream to a workstation controller. The workstation controller selectively interacts with all of the DWS devices, selectively activating the appropriate device and then passing the information to be displayed onto the selected DWS device.

The present invention contemplates extending the data stream interface between the host processor and the WSC, or between the host processor and the PWS, to allow the definition of information relating to panel scrolling. The invention further contemplates the processing and storing of this additional data stream information within the WSC, or within the PWS, so that scrolling requests originating at a terminal can be processed locally within the WSC. Therefore, the data stream will be extended to include not only panel data which is destined for immediate display on the screen of a remote terminal, but also panel data which may be potentially displayed, depending upon whether the user activates the appropriate scrolling function keys. This constitutes a departure from the prior art, where scrollable panel data was always destined for immediate screen display, and therefore was transmitted as a physical screen representation; i.e., the data was assigned to particular screen locations at the time of transmission. According to the present invention, the scrollable panel area data will be stored locally within the WSC (or PWS) in the form of a logical representation; i.e., data defined as scrollable panel area data without constraints as to actual screen addresses. The invention contemplates that the WSC (or PWS) may generate the physical representation, i.e., screen addresses, as a result of its own internal processing capabilities, utilizing the logical representations transmitted by the host processor.

The invention also contemplates the extended data stream to include a definition of cursor-independent scrolling keys; the application or host display data manager software within the host processor may define the valid cursor-independent scrolling keys, and this definition is included in the data stream. In particular, specified function keys (e.g. F7/F8) at the remote terminal may be defined and assigned to implement up/down scrolling functions, in addition to the "roll up/down" or "page up/down" keys which are always enabled as scroll keys.

The invention also contemplates the extended data stream to include a scrolling increment definition; i.e., the number of scrollable panel area items to be scrolled.

The host application or display data software may define this scrolling increment, and the actual processing to control the scrolling increment may be implemented by the WSC (or PWS). The scrolling increment is typically "N/2" or "N−1", where "N" is the number of items displayed at a time within the scrollable panel area. The scrolling increment can also be defined relative to the cursor position, which means that scrolling forward moves the current item to the top of the scrollable panel area, and scrolling backward moves it to the bottom of the scrollable panel area. A further and more complete definition of the scrolling increment may be found in IBM Publication SC26-4583-0, entitled "CUA Basic Design Guide."

The invention also contemplates the extended data stream to include the definition of scroll indicators; i.e., whether a scroll indicator should be textual or symbolic, or a combination thereof. The scrolling indicator definition also includes the initial state of the scrollable panel area; i.e., whether the scrollable items are an intermediate section of a larger entire set of scrollable items, or, if textual indicators, what the first item number displayed is and (optionally) the total number of items that exist. Reference should be made to the aforementioned IBM Publication for a further and more complete discussion of scroll indicators. The host processor application or display data manager software may define the types of scroll indicators to be used, and the information required to present them. The internal processing within the WSC (or PWS) will thereafter control the definition and presentation of the scroll indicators, according to the defined CUA rules.

Figure 6A:

FIGS. 6A and 6B show an example of the operation of function key scrolling according to the teachings of the invention. FIG. 6A shows a display panel having a scrollable panel area which includes the displayed text from the line beginning "Inventor" and extending through the line beginning "Reportfb." The cursor-independent scrolling keys which have been defined by the host processor application software are the F7 key, which may command a backward or reverse scroll, and the F8 key, which may command a forward scroll. The scrolling increment has been defined by the host processor applications software to be a function of the cursor position, thereby permitting a scrolling increment of anywhere from 1 to 15 lines. In the example shown, the cursor position is placed adjacent the line beginning "Monthly." The scroll indicators have been defined as symbolic indicators, as evidenced by the downward arrow opposite the word "More:". In the example of FIG. 6A, the downward arrow indicates that scrollable panel data can be viewed beneath the currently displayed data. Therefore, the F8 function key will command the DWS to increment the scrollable panel data to place the line where the cursor has been positioned at the top of the scrollable panel data list. FIG. 6B shows the scrollable panel area after the F8 key has been depressed by the user and processed by the WSC (or PWS). In this example, the line beginning "Monthly" is at the top of the scrollable panel data list, followed by 15 lines of scrollable data. The scrolled indicator now shows "More:" with both an upward and downward arrow, indicating that scrollable data may be found in either direction.

Figure 7A:
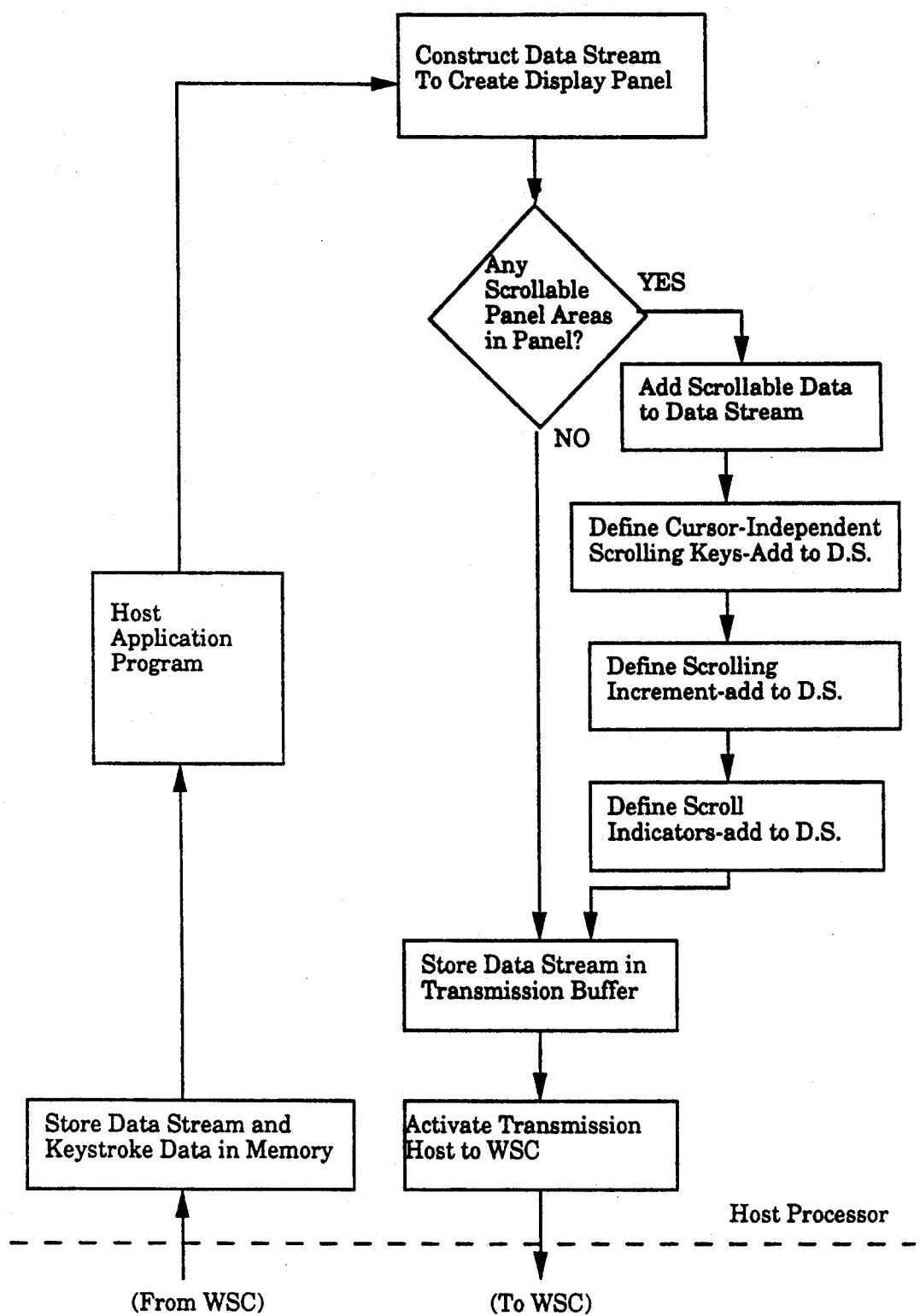
FIGS. 7A and 7B show flow charts of the processing steps associated with the practice of the invention.
Figure 7B:
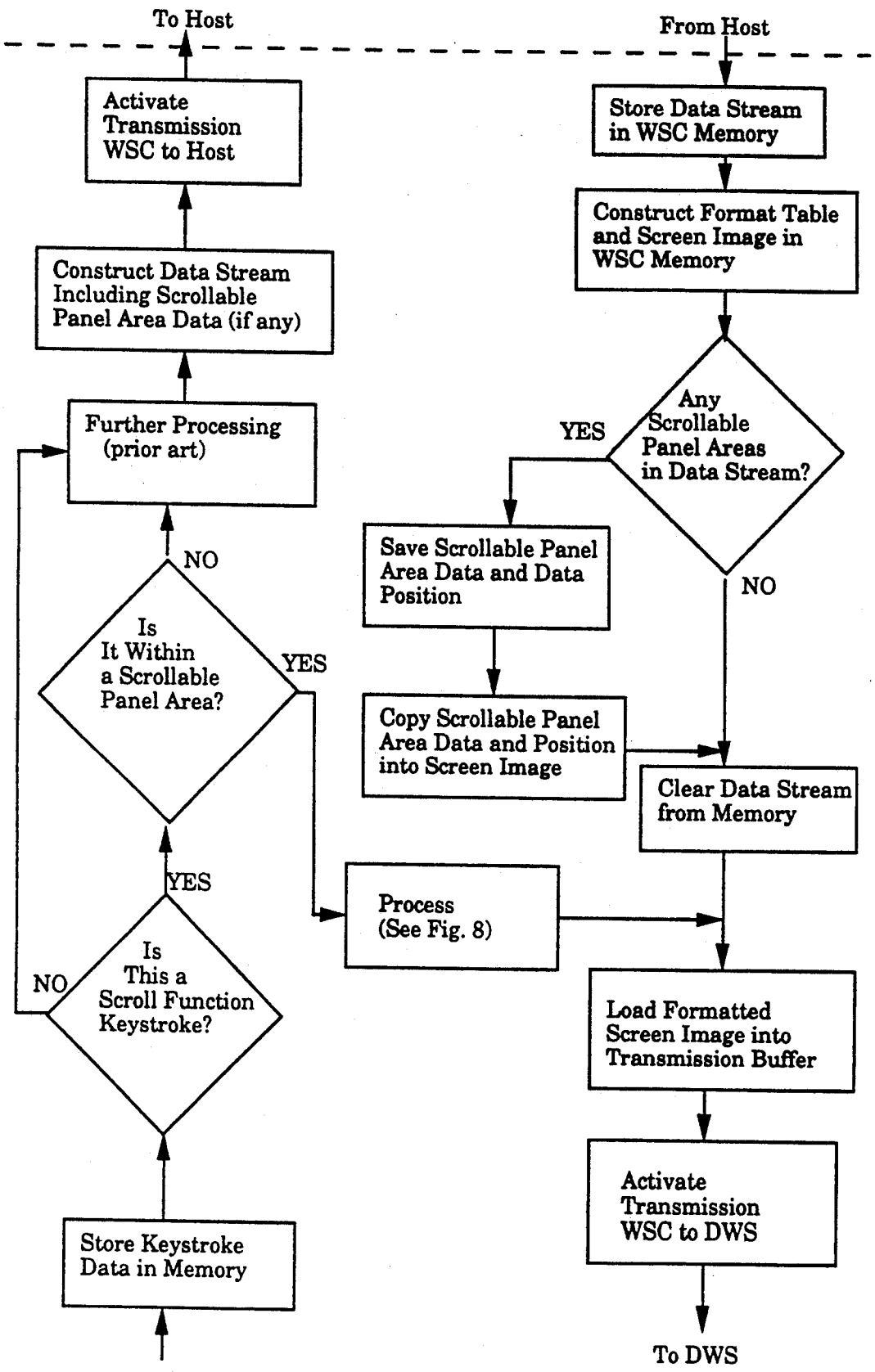

FIGS. 7A and 7B illustrate the interactive processing which is utilized in conjunction with the invention. Referring first to FIG. 7A, the host processor application software, and/or the host processor display data manager, construct a data stream to create a display panel. If there are scrollable panel areas included in the display panel, the data stream is expanded to include the scrollable data, to define the cursor-independent scrolling keys which can manipulate the scrollable panel area, to define the scrolling increment which will be used to move the scrollable panel data list, and to define the scroll indicators which will be displayed as a part of the panel area. After the data stream has been extended to include this information, the data stream is stored in a transmission buffer, and the host processor activates a transmission to the workstation controller (or PWS). FIG. 7B illustrates the processing steps which occur in the workstation controller (or PWS). The data stream is stored in memory, and a format table and screen image are constructed in memory, to physically define the display image which will appear on the terminal screen. If there are scrollable panel areas included in the data stream, the scrollable panel area data to be displayed is saved, together with the logical position of this data, relative to the start of the scrollable panel area. The portion of the scrollable panel area data to be displayed, and the calculated physical position, are then copied into the screen image. The WSC then loads the formatted screen image into a transmission buffer that activates a transmission to the DWS, to initiate the screen display.

Figure 8:
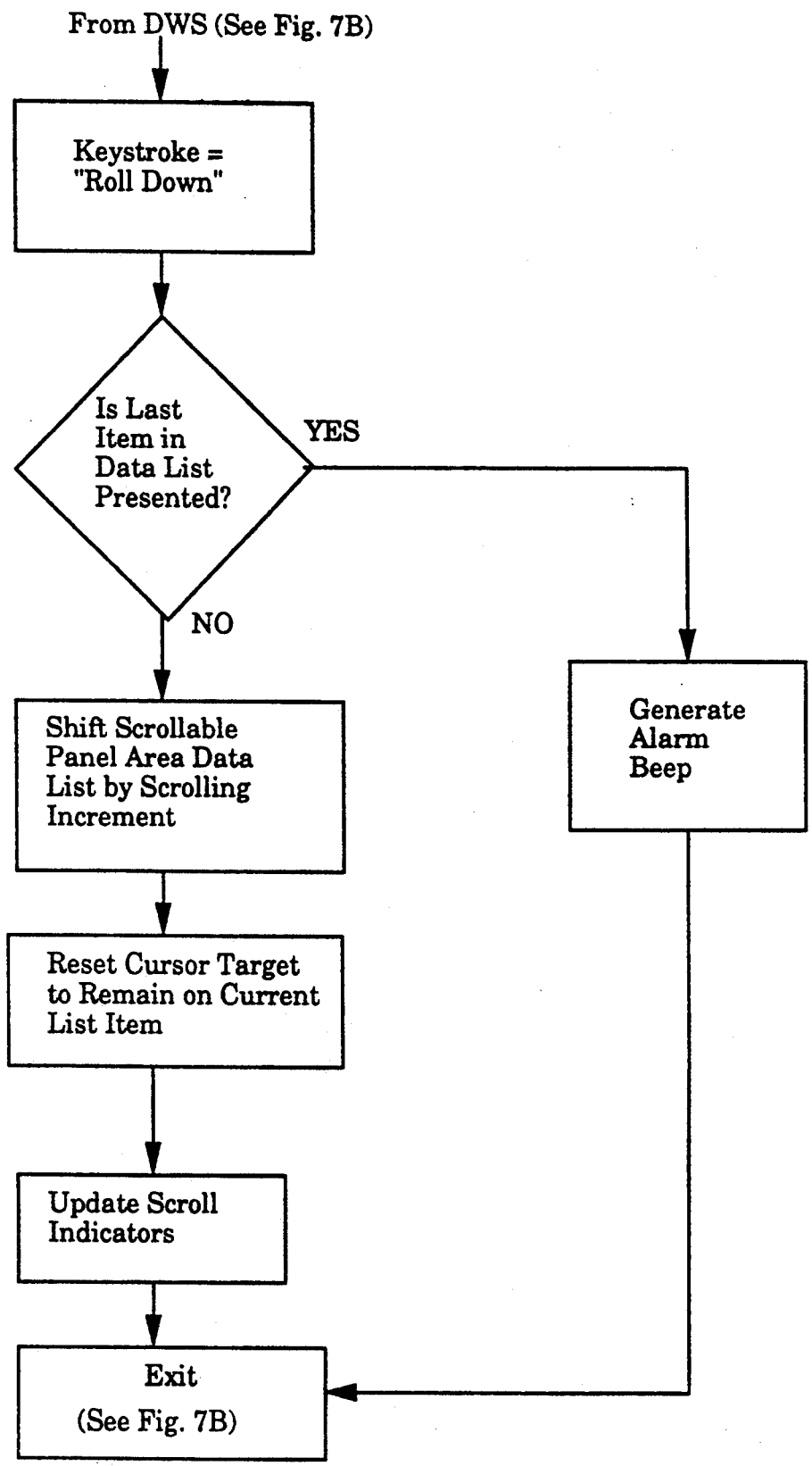
FIG. 8 shows a further processing flow chart.

FIGS. 7A and 7B also illustrate the steps for processing a keystroke action taken by the user at the DWS terminal. The WSC receives a signal indicative of the keystroke, and stores the keystroke data in memory. The WSC then determines whether the keystroke is a scroll function keystroke, or is of some other type. If another function key type was pressed, or if a scroll key was pressed when the cursor is not within a scrollable panel area, the keystroke is processed according to the teachings of the prior art outside the scope of this invention, and a data stream is constructed to transmit information back to the host processor. The host processor application program ultimately responds to the keystroke. If the keystroke by the user is a scroll function keystroke and the cursor is within a scrollable panel area, the WSC then activates a series of processing steps as illustrated in FIG. 8. The keystroke is examined to determine which scroll function keystroke has been activated, and the example of FIG. 8 assumes that a "roll down" keystroke has been activated. The WSC then determines whether there still remain further items in the data list to be presented, or whether the display currently being presented to the user includes the last item in the data list. If it is the last item, there are no more scrollable items to be presented, and the WSC will generate an alarm, usually an audible "beep" signal, and an exit back to the processing steps shown in FIG. 7B. If there are further items on the scrollable data list to be presented, the WSC shifts the scrollable panel area data list by the number of lines indicated by the scrolling increment, presets the cursor target position to remain positioned adjacent to the current list item, updates the scroll indicators, and then exits to the processing steps shown in FIG. 7B. These processing steps lead to the WSC transmitting a new screen image to the DWS for display to the user.

It is important to note in the foregoing processing steps that the WSC has taken on a great many of the processing functions formerly performed by the host processor. After the host processor constructs a data stream and transmits the data stream to the WSC, the host processor no longer needs to be interrupted for cursor-independent keystrokes which command scrolling movements. All of these movements are handled by interaction between the DWS and the WSC, independent of host processor participation, and the scrolling therefore appears to the user to be instantaneous.

The foregoing examples have been made with reference to the WSC/DWS interface, but it is to be appreciated that a similar set of processing steps are implemented in the case of a PWS/host processor connection. In this case, the PWS includes logic circuits or software functionally equivalent to the WSC logic circuits and software, and the processing steps are entirely accomplished within the PWS. In either event, the specific cursor-independent scrolling functions are unloaded from the host processor, and performed in the equipments associated with the terminal devices themselves.

In its most general context, the host processor interacts with a plurality of display screen/keyboard workstations through a control interface, by constructing and transmitting to the control interface a data stream which embodies the logical constructs required for defining the display panel images. The workstation control interface interacts with the individual workstations by utilizing the logical content of the data stream to construct a physical display panel layout, which it transmits to the selected workstation. Keystroke signals from the workstation are received by the workstation control interface and are incorporated into a data stream for retransmission by the workstation control interface to the host processor, except in the case of the locally processed keystrokes, for example, cursor-independent keystrokes. These keystrokes are processed entirely within the workstation control interface, without reference to the host processor, and cause the workstation control interface to create new display panel images for the workstation which initiated the keystroke.

The invention enables all scrollable panel area data to be saved locally, either within the WSC or the equivalent circuitry of the PWS. This enables instantaneous response to user scrolling requests by eliminating the need to generate a host processor interrupt whenever a scroll request is invoked. In this manner, the WSC (or PWS) has the capability to present and manage scrollable data. In addition, the WSC (or PWS) has the ability to present and manage scroll indicators, thereby enabling the utilization of the best individual device capabilities, depending upon the particular terminals involved. Graphical devices may use scroll bars, whereas character devices may use arrows for symbolic indicators. Alternatively, "+" and "−" characters may be used in substitution for arrows. When scrolling occurs, the WSC (or PWS) can automatically update the scroll indicators, thereby providing real time scrolling feedback.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. In a computer system having a host processor with means for executing applications programs, and a plurality of workstations connected to said host processor through a workstation control interface, each of said workstations having means for activating cursor-independent scrolling, the improvement in distributive processing of cursor-independent scrolling comprising:
   a) transmitting means for transmitting a data stream from said host processor to said workstation control interface, said data stream including scrollable panel data, definition of cursor-independent scrolling keys, definition of scrolling increment and definition of scroll indicators;
   b) constructing means in said workstation control interface for constructing a scrollable data panel, said constructing means utilizing said definition of scroll indicators, to calculate and transmit the physical position of said data panel from said workstation control interface to said workstation;
   c) receiving means in said workstation control interface for receiving from said workstation said means for activating cursor independent scrolling; and
   d) responding means responsive to said means for activating cursor independent scrolling, said responding means utilizing said definition of cursor-independent scrolling keys and said definition of scrolling increment to create a new data panel and to transmit said new data panel to said workstation.

2. The apparatus of claim 1, further comprising means in said workstation control interface for receiving said data stream from said host processor for each of said plurality of workstations connected to said workstation control interface.

3. The apparatus of claim 2, further comprising, in said workstation control interface, means for storing said scrollable data panels for each of the plurality of workstations connected to said workstation control interface.

4. A method of distributing the processing of cursor-independent scrolling functions between a host processor and a workstation controller, wherein said workstation controller is connected to said host processor and to a plurality of workstations, each of said workstations having means for requesting cursor-independent scrolling of display panel data at said workstation, said method comprising the steps of:
   a) formulating a data stream in said host processor, said data stream including said display panel data, definition of cursor-independent scrolling keys, definition of scrolling increments and definition of scroll indicators;
   b) transmitting said data stream from said host processor to said workstation controller;
   c) formulating a display screen panel in said workstation controller by utilizing said definition of scroll indicators, said panel including and at least a portion of said scrollable panel data;
   d) transmitting said display screen panel from said workstation controller to one of said plurality of workstations;
   e) modifying said display screen panel in said workstation controller in response to said workstation means for requesting cursor-independent scrolling, and in response to said definition of cursor-independent scrolling keys and definition of scrolling increments; and
   f) transmitting said modified display screen panel from said workstation controller to said requesting workstation.

* * * * *